3,326,857
METHOD FOR MANUFACTURING A COPOLYMER OF FORMALDEHYDE AND AN ACID ANHYDRIDE
Shohachi Kawasumi, Kenichi Maemoto, and Masayoshi Onishi, Niihama-shi, Japan, assignors to Sumitomo Chemical Company, Ltd., Osaka, Japan, a corporation of Japan
No Drawing. Filed Aug. 12, 1963, Ser. No. 301,614
Claims priority, application Japan, Aug. 15, 1962, 37/35,378; May 30, 1963, 38/28,379
14 Claims. (Cl. 260—67)

This invention relates to a copolymer containing formaldehyde as one constituent of the polymer molecular chain and at least one kind of anhydride of aliphatic, alicyclic and aromatic polybasic carboxylic acid as the other constituent, and to a method for manufacturing the same.

It has been known that a copolymer of formaldehyde is obtained by conducting a polymerization of formaldehyde in the presence of a specific compound under suitable conditions.

As compounds capable of being polymerized with formaldehyde, fluoraldehyde, (Japanese patent publication No. 1,395/1960), polyalkyleneglycols (Japanese patent publication No. 2,194/1960), isocyanic acid (U.S.P. No. 3,043,803), isocyanates and isothiocyanates (Japanese patent publication No. 16,742/1961) acetaldehyde (Belgian Patent No. 603,843) vinyl ethers, vinyl nitrogen compounds, isobutylene and alkylene oxides (Brit. Patent No. 911,960) have been known. It has been known also to obtain copolymers of trioxane with cyclic ethyleneglycol formal, 1,3-dioxane, 4-phenyl-1,3-dioxane, styrene oxide, tetrahydrofuran, β-propiolactone, γ-butyrolactone, glycol carbonate, cyclic adipic anhydride, styrene, vinyl ether, vinyl acetate, vinyl methyl ketone, acrolein, etc. (Angewandte Chemie, 73, 177 (1961)); ethylene oxide, 1,3-dioxolane, epichlorohydrin, etc. (U.S.P. No. 3,027,-352); γ-butyrolactone, phthalide (U.S.P. No. 3,026,299); or acrylonitrile (Belgian Patent No. 610,223), by employing trioxane which takes a different mechanism in polymerization and which is polymerizable more easily than formaldehyde.

One object of this invention is to provide copolymers which are different from the above-mentioned copolymers in their combination and are composed of formaldehyde and a cyclic anhydride of polybasic carboxylic acid. Another object of this invention is to provide a method for manufacturing the same.

Another object of this invention is to provide copolymers of formaldehyde which are suitable for making molded articles having high tenacity and high heat stability.

A further object of this invention is to provide formaldehyde copolymers having a controlled molecular weight so as to satisfy the requirements of a particular purpose, and a method for manufacturing the same. Further objects of this invention will be clear from what is explained hereinafter.

The copolymer of this invention has a polymer molecular chain consisting of units of formaldehyde as one component and units of intramolecular anhydride of polybasic carboxylic acid as the other component.

This copolymer can be produced by contacting substantially anhydrous formaldehyde with a catalyst selected from the group consisting of organic amines, organic phosphines, their salts and their onium compounds, in the presence of at least one kind of cyclic anhydride of aliphatic, alicyclic or aromatic polybasic carboxylic acid.

According to a preferred embodiment of the method of this invention, a cyclic anhydride of carboxylic acid is dissolved in an organic solvent which is inert with respect to the polymerization reaction, and an initiator (catalyst) for the polymerization reaction is added thereto. While the resulting liquid is being stirred, formaldehyde gas is blown into the liquid preferably at a temperature of −40° C. to +50° C. In this case, such a method in which the cyclic anhydride of carboxylic acid and/or the catalyst are added to the polymerization system according as they are consumed, is also possible. It is also possible to conduct the polymerization reaction by having a cyclic anhydride of carboxylic acid present in liquid formaldehyde without employing any organic solvent as reaction medium. According to another embodiment of the method of this invention, it is possible to control the average molecular weight of the copolymer by conducting the polymerization reaction in the presence of a controlled amount of a chain-transfer agent selected from compounds having an active hydrogen atom and non-cyclic anhydride of carboxylic acids.

The resulting copolymer is generally obtained as a solution or a dispersion which can be separated by means of filtration, or by means of the evaporation of reaction medium or by other known methods.

Solubility of the copolymer of this invention in polar solvents such as acetone, dimethylformamide, etc., varies according to not only the kind of constituent comonomer but also the composition of monomer unit in the copolymer and molecular weight. Accordingly, it is possible to separate the copolymer into fractions suitable for different purposes, by use of a polar solvent.

It is preferable in this invention to use formaldehyde monomer which is sufficiently purified. Formaldehyde often contains such impurities as water, methyl alcohol, formic acid, etc. If these impurities are present in the polymerization system, they lead to chain-transfer and side-chain formation by which formation of the desired polymer is prevented. In some cases, a procedure in which the degree of removal of the impurities is limited purposely to promote chain transfer so as to reduce the molecular weight of the resulting copolymer, or as to add in which a slight amount of these impurities is added to the once purified formaldehyde monomer, may be used. Except in a special case in which amount of the existing impurities is controlled, the presence of these impurities is not desirable.

For the purpose of purifying formaldehyde, it is simple to use a partial polymerization method at a low temperature in which formaldehyde is passed through a condensing tube sufficiently cooled e.g. by a mixture of Dry Ice and methyl alcohol (J. Am. Chem. Soc., 55, 2824 (1933)). The method which uses hemiformal of alcohols is also effective for the same purpose. There is no restriction on the method for the purification of formaldehyde so long as it meets the requirements of this invention.

Purified formaldehyde is fed to the polymerization system, collectively in a batch or little by little continuously in its original form, in a gaseous state together with a carrier gas like nitrogen, in a liquid state at a low temperature, or in a state of solution dissolved in a suitable solvent.

The cyclic anhydrides of carboxylic acids to be used in this invention are those of polybasic (generally dibasic or tetrabasic) aliphatic, alicyclic or aromatic carboxylic acids e.g. succinic anhydride, methyl-succinic anhydride, dodecylsuccinic anhydride, itaconic anhydride, maleic anhydride, citraconic anhydride, glutaric anhydride, glutaconic anhydride, adipic anhydride, sebacic anhydride, phthalic anhydride, 3,6-dichlorophthalic anhydride, 4,5 - dichlorophthalic anhydride, tetrachlorophthalic anhydride, cis-tetrahydrophthalic anhydride, hexahydrophthalic anhydride, pyromellitic anhydride, naphthalic anhydride, diglycolic anhydride, and the like, are useful in this invention. It is preferable to purify these cyclic anhydrides of carboxylic acids as sufficiently as the formaldehyde. Though the common pure grade commercial product may be used, the impurities in the form of the corresponding free acids which are frequently found in these anhydrides participate in polymer chain-transfer during the polymerization, by the action of the active hydrogen atom. Accordingly, if such a chain transfer is not required, the cyclic anhydride of carboxylic acid must be used in grade of sufficiently high purity. If necessary, it is preferable to purify by sublimation, or recrystalization with such a solvent as acid chlorides, tetrahydrofuran, ethers, or dimethylformamide. Feed of the cyclic anhydride of carboxylic acid to the polymerization system can be effected in the state of sublimated vapor, in a liquid state dissolved in suitable solvent or in the state of solid or slurry, collectively in a batch or little by little continuously.

There is no limitation as to the ratio of the cyclic anhydride of carboxylic acid to formaldehyde during the reaction. For example, if a copolymer which is rich in a cyclic anhydride of carboxylic acid is desired, it can be raised up to any value as desired. The effective amount of cyclic anhydride of carboxylic acid existing during the polymerization has an upper limit due to the solubility in the reaction medium in those conditions. Even when the upper limit is low due to the low solubility, it is possible to raise the proportion of the effective amount of cyclic anhydride of carboxylic acid by reducing the blowing speed of formaldehyde monomer. When the proportion of the effective amount of this material is high, it is likely to produce a copolymer which contains individual molecules whose end groups of the molecular chain are acid residue.

It is preferred to maintain the above mentioned proportion at a constant value, regardless of its absolute value, and to maintain the concentration of each monomer at as constant a value as posible so as to make the distribution of the composition in the copolymer uniform. For this purpose, its monomer is supplied in accordance with each consumption. However, when a carboxylic acid-cyclic anhydride-rich copolymer is required, it is simple and effective to add this material in an amount of more than saturation solubility in the reaction medium, and to allow it to remain as a solid phase so as to be dissolved in the reaction medium in accordance with the consumption, by which an approximately constant value of the effective concentration is achieved.

Carboxylic acid anhydrides to be used in this invention are cyclic anhydrides. Common carboxylic acid anhydrides are not useful and accordingly are excluded. For example acetic anhydride can participate in polymerization reaction but it cannot be a chain forming member though it causes chain transfer.

As initiator (catalyst) of polymerization, any materials capable of initiating ionic polymerization are generally useful, especially organic amines, organic phosphines, their salts and their onium compounds. Among those preferable catalyst compounds, n-butyl amino, di-n-butyl amine, triethylamine, tri-n-butyl amine, trilauryl amine, dilauryl benzyl amine, aniline, dimethyl aniline, triphenyl phosphine, tri(dimethylamino) phosphine, tetra-n-butyl ammonium laurate, trimethyl stearyl ammonium laurate are illustrated. On the whole, a compound affording anionic polymerization mechanism is more convenient to obtain a copolymer of high molecular weight than one affording cationic polymerization mechanism.

A suitable medium which is useful in conducting the polymerization method of this invention is such an organic solvent as propane, butane, hexane, heptane, decane, cyclohexane, methyl cyclohexane, benzene, toluene, xylene, cumene, dimethyl ether, diethyl ether, tetrahydrofuran, acetone, methyl ethyl ketone, methylene chloride and dimethyl formamide.

There is no strict range for polymerization temperature but temperature ranging from $-50°$ C. to $+50°$ C. is generally used. When the formaldehyde is introduced into a reaction system maintained at a relatively higher temperature within the above mentioned range in a gaseous state together with a carrier gas like nitrogen, the polymerization yield may be slightly reduced and the resulting polymer is rich in cyclic anhydride of carboxylic acid. When the temperature is relatively lower, the opposite effect is achieved. If the polymerization temperature is higher than $60°$ C., the yield of copolymer is greatly reduced.

The copolymer thus obtained has generally high molecular weight and is useful in various kind of molded products and films. However from the standpoint of good processability, and from the demand due to widespread uses, copolymers having various molecular weights are required. Although the mean molecular weight of the resulting copolymer varies according to the amount of cyclic anhydride of carboxylic acid, the kind of polymerization medium and polymerization time, these factors are not suitable for controlling mean molecular weight because they have such disadvantages as to make the free selection of the copolymer composition impossible or to narrow the controlling range. For example the more the cyclic anhydride of carboxylic acid is used, the more the mean molecular weight of the resulting copolymer is reduced, and simultaneously the higher the content of the cyclic anhydride of carboxylic acid becomes.

Accordingly it is impossible to control the content of the cyclic anhydride of carboxylic acid and the mean molecular weight simultaneously. Especially in the part where the content of the cyclic anhydride of carboxylic acid is low, only a copolymer having high mean molecular weight is obtainable. Variation of the polymerization medium causes variation of mean molecular weight of the copolymer. However freedom for selecting polymerization degree is small in this case, hence selection of polymerization medium is insufficient for controlling molecular weight. Further mean molecular weight can be controlled by variation of polymerization time. Even when the proportion of acid anhydride is relatively low, if polymerization time is short, the possibility that the end groups of the polymer chains are terminated by carboxylic acid cyclic anhydride units becomes high, and thereby the resulting copolymer shows strong acidity in the presence of water and for this reason heat stability of the copolymer is deteriorated.

In order to control the mean molecular weight of the copolymer without bringing about such a drawback, it is preferred to add a small amount of a chain transfer agent which is selected from the compounds having active hydrogen and non-cyclic anhydrides of carboxylic acids to the polymerization system of cyclic anhydride of carboxylic acid and formaldehyde.

As chain transfer agents having active hydrogen the following compounds are useful in this invention: water, alcohols, thio alcohols, lactams, hydrazines, acids, acid amides, for example water, methyl alcohol, ethyl alcohol, benzyl alcohol, low molecular weight polyethylene glycol, acetyl acetone, ethyl acetoacetate, dodecyl mercaptan, pyrrolidone, piperidone, E-caprolactam, enantholactam, hydrazine, formic acid, acetic acid, acetamide and acetanilide.

As chain transfer agents which are non-cyclic anhydrides of carboxylic acids, anhydrides of acetic acid, propionic acid, butyric acid, heptanoic acid, and benzoic acid, are useful.

The control of mean molecular weight of the copolymer in the present invention is conducted so as to inherent viscosity of the resulting copolymer falls between from 0.2 to 1.4 dl./g., preferably from 0.5 to 1.0 dl./g. (The inherent viscosities in this text including specific examples are values of solutions comprising 0.5 percent copolymer, 1 percent diphenyl amine and the remains of dimethylformamide, measured at 150° C. by Ostwald's viscosimeter. Approximate mean molecular weight of the copolymer can be assumed by these inherent viscosities.)

Then the amount of addition of chain transfer agent is preferred to be conducted so as the mol ratio of this material to formaldehyde comes in the range of 10–10,000 p.p.m. As the effect of mean molecular weight control by water, alcohol, acetyl acetone and the like is so great that relatively smaller values in the above mentioned range will be sufficient. For example less than 5000 p.p.m. normally from 10 to 2000 p.p.m. will be sufficient. The effect of molecular weight control by such compounds as lactam, acetic anhydride and the like, is inferior to that of water, alcohol and acetylacetone. Accordingly it is necessary to use commonly from 30 to 10,000 p.p.m.

The chain transfer agent is added to the polymerization system in one of various states according to its property, in other words a gaseous state, in a solution state by employing appropriate solvent, or in its original form, during the polymerization time or prior to polymerization. It is possible to obtain copolymers having optional mean molecular weight, according to the amount of addition of this material. In other words, mean molecular weight of the copolymer becomes low according as the increase of the amount of addition of chain transfer agent. Furthermore the resulting copolymer does not show acidity in this case when the cyclic anhydrides of carboxylic acids are employed in a small ratio to formaldehyde.

The fact that the polymer obtained by the present invention is really a copolymer of formaldehyde and cyclic anhydride of carboxylic acid can be confirmed by the data of elementary analysis and infrared spectroscopy conducted on the polymer and on the part obtained by fractional precipitation thereof by use of solubility difference. The data of elementary analysis of the resulting copolymer show the intermediate value between formaldehyde and cyclic anhydride of carboxylic acid. In infrared spectroscopic data absorption due to ester type carbonyl group is found. In the case of dicarboxylic acid anhydride, absorptions due to carbonyl group are found at the wave number 1820 cm.$^{-1}$ and 1760 cm.$^{-1}$. In the case of polymer obtained by the present invention absorption due to ester type carbonyl group is found at wave number 1735 cm.$^{-1}$ instead. In the case of dicarboxylic acid anhydride having a characteristic absorption, change of infrared absorption is seen in accordance with the change of dicarboxylic acid anhydride into polymer chain constituent. For example when phthalic anhydride is used in this invention, the absorption at the wave number 714 cm.$^{-1}$ due to its aromatic structure changes into absorptions at the wave number 743 cm.$^{-1}$ and 705 cm.$^{-1}$ in the resulting copolymer.

Ordinarily, the copolymer according to the present invention contains from about 1 to about 40 mole percent particularly about 1 to about 30 mole percent, of polybasic carboxylic acid units in the molecule.

The copolymers having various properties according to the kind of comonomer selected, its content, degree of polymerization and method of polymerization, are obtained in the method of this invention.

When a compound which affords a chain structure similar to straight polymer of formaldehyde, for example such a compound as succinic anhydride or adipic anhydride is used in copolymerizing with formaldehyde, a copolymer having relatively high crystallinity is obtained. This material can be molded into a hard and tenacious article having good mechanical properties. Even in this case, when a large amount of acid anhydride is included as a constituent of the copolymer chain, crystallinity of the copolymer is greatly reduced.

When a compound which affords a chain structure dissimilar to straight polymer of formaldehyde for example phthalic anhydride is used in copolymerizing with formaldehyde, generally low crystalline or amorphous copolymer is obtained. The field of utility of these low crystalline polymers must be varied according to the mean molecular weight, but they are suited for film, rubbery articles, paints and adhesives.

Heat stability of the copolymer of the present invention is, on the whole, good, but various procedures are taken in order to increase its heat stability further or to modify other properties. Namely by reacting such compounds as monobasic acid anhydride like acetic anhydride, orthocarboxylic acid ester, alcohol, acrylonitrile, phenylisocyanate, tolyldiisocyanate and the like in the presence of a suitable catalyst, the hydrogen atom of the hydroxy group existing at the end of copolymer chain can be changed into acyl-, alkyl-, cyanoethyl- or urethane-group, by which heat stability of the copolymer is increased. Particularly in the urethane radical, even the acid residue is changeable. When a copolymer whose content of carboxylic-acid-cyclic-anhydride-constituent is large is treated with tolyldiisocyanate, the elasticity as well as the heat stability of the copolymer is increased. It is also possible to add further various kind of stabilizer to the above-mentioned treated polymer to prevent deterioration due to heat at the time of processing or due to employment of long terms. As a stabilizer for this purpose, such ultra violet stabilizers as phenyl salicylate, 2-hydroxy-4-methoxybenzophenone, 5 - chloro - 2 - hydroxybenzophenone, 2,4-dibenzolyresorcinol, such heat stabilizers as melamine, urea, acetamide, benzoylhydrazine, synthetized polyamide, such anti-oxidizing agents as 4,4′-isopropylidene-bisphenol, 2,6-bis(2′-hydroxy-3′-tert. butyl-5′-methyl benzyl) - 4 - methylphenol, 4,4′ - dihydroxyphenolcyclohexane, 4,4′ - butylidenebis(3 - methyl - 6 - tert.-butylphenol), Topanol (trade name), are useful. These stabilizers can be used alone, or together with others. They are added to the copolymer in an amount each 0.1–1.0 percent by weight in a state of solution in water, methanol, acetone or benzene whose percentage is varied according to solubiltiy. The composite materials are made into film by heat-pressing and the effect of addition is measured.

A more comprehensive understanding of the invention can be obtained by referring to the following illustrative examples which are not intended, however, to be unduly limitative of the invention.

In the following example, $k_{222}$ value means a velocity-constant of thermal decomposition of a polymer at 222° C., and the content of carboxylic acid-cyclic anhydride in a copolymer is given by means of weight.

*Example 1*

1 l. of dried toluene containing 40 g. of phthalic anhydride and 0.4 g. of triphenylphosphine was kept stirring at room temperature. Into this solution a gas mixture composed of 25 percent formaldehyde and 75 percent nitrogen which had been purified by passing through a trap kept at temperature of −15° C., was blown for 150 minutes at the rate of 80 l./hr. The resulting white polymer was filtered from the reaction mixture, and washed by admixing with 300 ml. of cold acetone under strong agitation. By repeating the same washing three times and drying under vacuum, 15 g. of white polymer powder was obtained.

This substance had the following properties:
Inherent viscosity: 0.107 dl./g.
Melting range: 105°–115° C.
Elementary analysis: C, 54.11%; H, 4.59%.

5 g. of this polymer was subjected to extraction by hot acetone, then 2.0 g. of soluble part and 2.5 g. of insoluble part were obtained. The hot-acetone-soluble part was a rubber-like substance having inherent viscosity of 0.012 dl./g., value of elementary analysis, C: 56.01 percent, H: 4.34 percent. The hot-acetone-insoluble part showed inherent viscosity of 0.171 dl./g., melting range of from 153° to 157° C., and value of elementary analysis, C: 52.82 percent, H: 4.91 percent.

Example 2

A gas mixture composed of 25 percent formaldehyde and 75 percent nitrogen which had been purified by passing through a trap kept at temperature of −45° C., was blown for 150 minutes at the rate of 80 l./hr. into 1 litre of dried toluene containing 40 g. of phthalic anhydride and 0.4 g. of tri-n-butylamine at room temperature while stirring. The resulting white polymer was filtered off from the reaction mixture and washed by admixing with 300 ml. of cold acetone under strong agitation. By repeating the same washing three times and drying under vacuum, 18 g. of white polymer powder was obtained. This substance showed the following properties:

Inherent viscosity: 0.582 dl./g.
Melting range: 162°–173° C.
Elementary analysis: C: 43.57 percent; H: 6.40 percent.

The above-mentioned cold acetone solution used in washing of the polymer was collected and heated under a reduced pressure, and 22 g. of rubber-like substance was obtained after removing acetone. This substance showed the following properties:

Inherent viscosity: 0.057 dl./g.
Elementary analysis: C: 56.71 percent; H: 4.70 percent.

Example 3

A gas mixture composed of about 25 percent of pure formaldehyde and about 75 percent of nitrogen which had been obtained by pyrolysis of α-polyoxymethylene under nitrogen stream and passed through a trap of −45° C., was blown into 1 litre of toluene containing 2.0 g. of succinic anhydride and 0.4 g. of the catalyst shown on the Table 1 at the rate of 80 l./hr. for 150 minutes at room temperature while strongly agitating in order to effect copolymerization of formaldehyde with succinic anhydride. In the polymerization the indicated amount of chain transfer agent shown on the Table 1 was added to the polymerization system for the purpose of controlling mean molecular weight in such a way as to mix with above gas mixture or to add in the solution state by dissolving in suitable solvent or to add directly in the original form. The resulting white polymer was filtered and washed by admixing with 300 ml. of acetone under strong agitation. By repeating the same washing three times followed by drying under vacuum, white polymer powder was obtained. The inherent viscosity of this polymer was measured in dimethylformamide solution at 150° C., in which 0.5 percent of the copolymer and 1 percent of diphenylamine was dissolved, by use of Ostwald's viscosimeter.

The melting range was measured by use of a closed capillary tube, and the content of succinic anhydride in the polymer was calculated from the result of carbon analysis. Acidity was also tested by litmus paper after wetting the copolymer with water. The results obtained are shown in the Table 1.

Note: In the column showing addition method in Table 1, g means that indicated molecular weight controller in gaseous state was mixed with the mixture of formaldehyde and nitrogen gas and added continuously as polymerization proceeds, s means that indicated molecular weight controller dissolved in 50 ml. of toluene was dropped continuously as polymerization proceeds, and a means that whole amount of indicated molecular weight controller was added to polymerization system in the original form before polymerization.

TABLE 1

| Experiment No. | Chain transfer agent | | | Polymerization catalyst | Copolymer | | | | |
|---|---|---|---|---|---|---|---|---|---|
| | Kind | Addition amount (g.) | Addition method | | Yield (g.) | Inherent viscosity (dl./g.) | Melting range (° C.) | Content of Succinic Anhydride (percent) | Acidity |
| 1 | | | | Triphenylphosphine | 25 | 1.246 | 167–178 | 4.8 | Acidic. |
| 2 | Water | 0.02 | (g) | ----do---- | 30 | 0.519 | 159–169 | 4.2 | Neutral. |
| 3 | ----do---- | 0.007 | (g) | ----do---- | 30 | 0.713 | 164–174 | 3.8 | Do. |
| 4 | Methyl alcohol | 0.01 | (g) | ----do---- | 31 | 0.749 | 166–171 | 3.3 | Do. |
| 5 | ε-Caprolactam | 0.5 | (s) | ----do---- | 33 | 0.924 | 166–174 | 3.9 | Do. |
| 6 | Acetic anhydride | 1.1 | (a) | ----do---- | 31 | 0.881 | 163–170 | 2.6 | Do. |
| 7 | | | | Tri-n-butylamine | 30 | 1.471 | 168–173 | 3.3 | Do. |
| 8 | Methyl alcohol | 0.06 | (g) | ----do---- | 32 | 0.941 | 166–171 | 5.6 | Do. |
| 9 | Acetylacetone | 0.05 | (s) | Triphenylphosphine | 26.3 | 0.743 | 163–170 | 5.6 | Do. |

The polymer obtained in the Experiment 1 of the Table 1 was white powder. 10 g. of this polymer was introduced in a mixed solution composed of 200 ml. of γ-butyrolactone, 40 ml. of acetic anhydride and 35 ml. of dimethylaniline and heated at a temperature of 140° C. for one hour, by which 9.7 g. of polymer whose end groups were acylated, inherent viscosity was 1.168 dl./g., and $k_{222}$ was 0.310 percent per min. Methanol soluble synthetic polyamide and 4,4′ - butylidene bis(3-methyl-6-tert. butylphenol) were added to this polymer in an amount of each one percent by weight of polymer, and pressed at 200° C. and 200 atm. for 3 minutes, and bubble-free, colorless, strong film was obtained.

The polymer obtained in Experiment 2 was also white powder. 10 g. of this polymer was introduced in a mixed solution composed of 200 ml. of dimethylformamide, 40 ml. of acetic anhydride and 35 ml. of dimethylaniline and heated at a temperature of 140° C. for one hour, by which 9.5 g. of polymer whose end groups were acylated and inherent viscosity was 0.794 dl./g. This was a very stable polymer which gave bubble-free film by pressing at 200° C. and 200 atm. for 3 minutes.

Example 4

By employing 1 litre of dried toluene containing 27 g. of succinic anhydride which had been purified by recrystallization by means of tetrahydrofuran, and 0.4 g. of triphenylphosphine, polymerization was carried out in accordance with Example 2. As polymerization proceeded, sponge-like lumps began to rotate at the bottom of polymerization vessel. On filtering this material from the polymerization medium and washing four times by ca. 300 ml. of cold acetone, followed by drying under reduced pressure about 50 g. of white polymer was obtained. This polymer showed inherent viscosity of 0.264 dl./g., melting range of 110°–135° C., $k_{222}$ value of 1.34 percent per min. and content of succinic anhydride of 43.0 percent by weight. This material showed acidity when it was wetted. 10 g. of this polymer was treated in 100 ml. of tolylene diisocyanate containing 1.6 ml. of dimethylaniline at a temperature of 120° C. for 30 minutes. It was washed by 300 ml. of toluene and acetone each two times and dried under reduced pressure, and 9 g. of polymer showing remarkable elasticity was obtained. This showed inherent viscosity of 0.326 dl./g., and melting range of 160°–172° C. Analytical result of elementary analysis showed that it contained 44.90 percent of carbon, 5.61 percent of hydrogen and 0.67 percent of nitrogen.

Example 5

By employing 1 litre of toluene containing 13.5 g. of succinic anhydride and 0.4 g. of triphenyl phosphine, polymerization was carried out in accordance with Example 2. In 40 minutes, 11.8 g. of copolymer having succinic anhydride content of 22 percent, in 80 minutes, 27.5 g. of copolymer having the content of 23 percent, in 120 minutes 41.5 g. of copolymer having the content of 22 percent, and in 160 minutes, 48.3 g. of copolymer having the content of 22 percent were obtained.

The composition of copolymers obtained in each polymerization time was nearly uniform.

Example 6

By employing 1 litre of dried toluene containing 2.5 g. of glutaric anhydride and 0.4 g. of triphenyl phosphine, polymerization and treatment were conducted in accordance with Example 2, by which 31 g. of white polymer was obtained. This showed inherent viscosity of 1.001 dl./g., $k_{222}$ value of 5.5 percent per min. and content of glutaric anhydride of 1.5 percent. 10 g. of this was treated in a mixed solution composed of 200 ml. of dimethylformamide, 40 ml. of acetic anhydride and 30 ml. of dimethylaniline, at a temperature of 140° C. for 1 hour and 9.5 g. of acylated white polymer was obtained. This showed inherent viscosity of 1.007 dl./g., $k_{222}$ of 0.3 percent per min. melting range of 158°–170° C. and glutaric acid content of 1.6 percent.

When 1 percent by weight of ura alone, one percent by weight each of urea and 4,4-butylidenebis(3-methyl-6-tert.-butylphenol) or the same percent each of synthetic polyamide and 4,4-dihydroxyphenylcyclohexane were added to this polymer and pressed at 200° C. and 200 atm. for 3 minutes, bubble-free, colorless strong film was obtained.

Example 7

By employing 1 litre of dried toluene containing 3 g. of cis-tetrahydrophthalic anhydride and 0.4 g. of triphenyl phosphine, polymerization and treatment of the resulting polymer were carried out in accordance with Example 2 and 29 g. of white polymer powder was obtained. This showed an inherent viscosity of 1.248 dl./g. ($k_{222}$ value was unstable) melting range of 168°–172° C. and cis-tetrahydrophthalic anhydride content of 1.6 percent. The crystallinity calculated from X-ray diffraction diagram was 73.7 percent. 10 g. of this polymer was treated in a mixed solution composed of 200 ml. of dimethylformamide, 40 ml. of acetic anhydride and 30 ml. of dimethylaniline at temperature of 140° C. for 1 hour, and 9.4 g. of white acylated polymer was obtained. This showed an inherent viscosity of 1.360 dl./g., ($k_{222}$ value was not measured) and melting range of 170°–171° C. When it was admixed with 2,6-bis(2'-hydroxy-3'-tert.-butyl-5'-methylbenzenyl)-4-methylphenol and pressed at 200° C. and 200 atm. for 3 minutes a bubble-free, colorless strong film was obtained.

Example 8

By employing 1 litre of dried toluene containing 9.3 g. of hexalhydrophthalic anhydride and 0.4 g. of triphenyl phosphine, polymerization and treatment of the resulting polymer were conducted in accordance with Example 2 and obtained 25 g. of polymer whose inherent viscosity was 1.206 dl./g., $k_{222}$ value was 10.5 percent per min., melting range was 168°–170° C. and content of hexahydrophthalic anhydride was 3 percent. By conducting acylation treatment according to Example 7, a polymer whose inherent viscosity was 1.310 dl./g., $k_{222}$ value was 1.47 percent per min. and melting range was 170°–172° C., was obtained in yield of 84 percent. When it was admixed with methanol soluble synthetic polyamide and 4,4'-butylidenebis(3-methyl-6-tert.-butylphenol) each in an amount of 1 percent and pressed as in Example 7, bubble-free film was obtained.

Example 9

By employing 16 g. of dodecylsuccinic anhydride, copolymerization and after-treatment of the resulting polymer were conducted in accordance with Example 2, and 22 g. of copolymer whose inherent viscosity was 1.524 dl./g., ($k_{222}$ value was unstable) melting range was 169°–173° C. and content of dodecyl succinic anhydride was 2 percent, was obtained. Acylation treatment of this polymer was conducted in acordance with Example 7, by which white polymer powder whose inherent viscosity was 1.518 dl./g., $k_{222}$ value was 0.329 percent per min. and melting range was 168°–173° C., was obtained in yield of 96 percent.

Example 10

By employing 15 g. of pyromellitic anhydride, coplymerization and after-treatment were conducted in accordance with Example 2.28 g. of copolymer whose inherent viscosity was 0.118 dl./g., ($k_{222}$ value was unstable) melting range was 145°–157° C., was obtained. This polymer showed strong absorption of carbonyl group in infrared-spectrographic diagram, by which content of several percent was assumed.

Example 11

By employing 6.7 g. of citraconic anhydride, copolymerization and after-treatment were conducted in accordance with Example 2, by which 10 g. of copolymer whose inherent viscosity was 0.526 dl./g. ($k_{222}$ value was unstable), melting range was 155°–163° C. and content of citraconic acid was 2 percent was obtained. By conducting acylation according to Example 7, a copolymer whose inherent viscosity was 0.620 dl./g., $k_{222}$ value was 0.303 percent per min., melting range was 165°–169° C. and content of citraconic acid was 1.6 percent, was obtained in yield of 82 percent. A methanol soluble synthetic polyamide and 4,4'-butylidenebis(3-methyl-6-tert.-butylphenol) were added to above-acylated polymer and the above mixture was pressed according to Example 7, and bubble-free, though slightly colored, good film was obtained.

Example 12

By employing 6.7 g. of maleic anhydride, copolymerization and after-treatment were conducted in accordance with Example 2, and 9.0 g. of copolymer whose inherent viscosity was 0.100 dl./g., ($k_{222}$ value was unstable) melting range was 139°–153° C. and content of maleic anhydride (assumed from data of elementary analysis) was 18 percent, was obtained. 5 g. of this polymer was heated in a mixed solution composed of 100 ml. of dimethylformamide, 20 ml. of acetic anhydride and 16 ml. of dimethylaniline at a temperature of 140° C., and a polymer whose inherent viscosity was 0.302 dl./g., $k_{222}$ value was 2.79 percent per min. (melting range was not measured) and content of maleic anhydride was 15 percent (assumed from data of elementary analysis) was obtained.

What we claim is:

1. A method for manufacturing a copolymer of formaldehyde and at least one kind of cyclic anhydride of polybasic carboxylic acid, which comprises contacting substantially anhydrous formaldehyde with a catalyst selected from the group consisting of organic amines, organic phosphines, their salts and their onium compounds, in the presence of at least one kind of cyclic anhydride of polybasic carboxylic acid selected from the group consisting of cyclic anhydride of aliphatic polybasic carboxylic acid and cyclic anhydride of alicyclic polybasic carboxylic acid and cyclic anhydride of aromatic polybasic carboxylic acid at a temperature of from −50° C. to +50° C.

2. A method according to claim 1, in which the said cyclic anhydride of polybasic carboxylic acid is a member selected from the group consisting of succinic, methylsuccinic, dodecylsuccinic, maleic, itaconic, citraconic, glutaric, adipic, sebasic, cis-tetrahydrophthalic, hexahydrophthalic, phthalic, 3,6 - dichlorophthalic, 4,5 - dichlorophthalic, tetrachlorophthalic, pyromellitic, and naphthalic anhydrides.

3. A method according to claim 1, in which the said catalyst is selected from the group consisting of triethylamine, tri-n-butylamine, trilaurylamine, dilaurylbenzylamine, triphenylphosphine, tri-dimethylaminophosphine, tetra-n-butylammonium laurate, and trimethyl-stearylammonium laurate.

4. A method for manufacturing a copolymer of formaldehyde and at least one kind of cyclic anhydride of polybasic carboxylic acid, which comprises contacting substantially anhydrous formaldehyde with a catalyst selected from the group consisting of organic amines, organic phosphines, their salts, and their onium compounds, at a temperature of from $-50°$ C. to $+50°$ C. in the presence of at least one kind of a cyclic anhydride of polybasic carboxylic acid selected from the group consisting of cyclic anhydride of aliphatic polybasic carboxylic acid, cyclic anhydride of alicyclic polybasic carboxylic acid, and cyclic anhydride of aromatic polybasic carboxylic acid, and a chain transfer agent selected from the group consisting of compounds having an active hydrogen atom and a carboxylic acid anhydride in an amount of 10–10,000 p.p.m. per amount of formaldehyde.

5. A method according to claim 4, in which the said cyclic anhydride of polybasic carboxylic acid is a member selected from the group consisting of succinic, methylsuccinic, dodecylsuccinic, maleic, itaconic, citraconic, glutaric, adipic, sebasic, cis-tetrahydrophthalic, hexahydrophthalic, phthalic, 3,6 - dichlorophthalic, 4,5 - dichlorophthalic, tetrachlorophthalic, pyromellitic, and naphthalic anhydrides.

6. A method according to claim 4, in which the said catalyst is selected from the group consisting of triethylamine, tri-n-butylamine, trilaurylamine, dilaurylbenzylamine, triphenylphosphine, tri-dimethylaminophosphine, tetra-n-butylammonium laurate, and trimethyl-stearylammonium laurate.

7. A method according to claim 4, in which the said chain transfer agent is selected from the group consisting of water, methyl alcohol, ethyl alcohol, benzyl alcohol, low molecular weight polyethylene-glycol, acetylacetone, ethyl acetoacetate, dodecyl mercaptane, pyrrolidone, piperidone, ε-caprolactam, enantholactam, hydrazine, formic acid, acetic acid, acetamide, acetanilide, acetic anhydride, propionic anhydride, butyric anhydride, heptanoic anhydride, and benzoic anhydride.

8. A method for manufacturing a copolymer of formaldehyde and at least one kind of cyclic anhydride of polybasic carboxylic acid, which comprises blowing substantially anhydrous formaldehyde into an inert liquid organic medium containing a catalyst and a cyclic anhydride of polybasic carboxylic acid, at a temperature of from $-50°$ to $+50°$ C., the said catalyst being selected from the group consisting of organic amines, organic phosphines, their salts, and their onium compounds, and the said cyclic anhydride being selected from the group consisting of cyclic anhydride of aliphatic polybasic carboxylic acid, cyclic anhydride of alicyclic polybasic carboxylic acid, and cyclic anhydride of aromatic polybasic carboxylic acid, and present in an amount of more than the saturation solubility in the medium.

9. A method according to claim 8, in which the said cyclic anhydride of polybasic carboxylic acid is a member selected from the group consisting of succinic, methylsuccinic, dodecylsuccinic, maleic, itaconic, citraconic, glutaric, adipic, sebasic, cis-tetrahydrophthalic, hexahydrophthalic, phthalic, 3,6 - dichlorophthalic, 4,5 - dichlorophthalic, tetrachlorophthalic, pyromellitic, and naphthalic anhydrides.

10. A method according to claim 8, in which the said catalyst is selected from the group consisting of triethylamine, tri-n-butylamine, trilaurylamine, dilaurylbenzylamine, triphenylphosphine, tri-dimethylaminophosphine, tetra-n-butylammonium laurate, and trimethyl-stearylammonium laurate.

11. A method for manufacturing a copolymer of formaldehyde and at least one kind of cyclic anhydride of polybasic carboxylic acid, which comprises blowing substantially anhydrous formaldehyde into an inert liquid organic medium containing a catalyst, a cyclic anhydride of polybasic carboxylic acid and a chain transfer agent in an amount of 10–10,000 p.p.m. per amount of formaldehyde, at a temperature of from $-50°$ to $+50°$ C., the said catalyst being selected from the group consisting of organic amines, organic phosphines, their salts, and their onium compounds; the said cyclic anhydride being selected from the group consisting of cyclic anhydride of aliphatic polybasic carboxylic acid, cyclic anhydride of alicyclic polybasic carboxylic acid, and cyclic anhydride of aromatic polybasic carboxylic acid, and present in an amount of more than the saturation solubility in the medium; and the said chain transfer-agent being selected from the group consisting of compounds having an active hydrogen atom and a carboxylic acid anhydride.

12. A method according to claim 11, in which the said cyclic anhydride of polybasic carboxylic acid is a member selected from the group consisting of succinic, methylsuccinic, dodecylsuccinic, maleic, itaconic, citraconic, glutaric, adipic, sebasic, cis-tetrahydrophthalic, hexahydrophthalic, phthalic, 3,6 - dichlorophthalic, 4,5 - dichlorophthalic, tetrachlorophthalic, pyromellitic, and naphthalic anhydrides.

13. A method according to claim 11, in which the said catalyst is selected from the group consisting of triethylamine, tri-n-butylamine, trilaurylamine, dilaurylbenzylamine, triphenylphosphine, tri-dimethylaminophosphine, tetra-n-butylammonium laurate, and trimethyl-stearylammonium laurate.

14. A method according to claim 11, in which the said chain transfer agent is selected from the group consisting of water, methyl alcohol, ethyl alcohol, benzyl alcohol, low molecular weight polyethylene-glycol, acetylacetone, ethyl acetoacetate, dodecyl mercaptane, pyrrolidone, piperidone, ε-caprolactam, enantholactam, hydrazine, formic acid, acetic acid, acetamide, acetanilide, acetic anhydride, propionic anhydride, butyric anhydride, heptanoic anhydride, and benzoic anhydride.

References Cited
UNITED STATES PATENTS

| | | | |
|---|---|---|---|
| 2,371,990 | 3/1945 | Hanford | 260—67 |
| 3,017,389 | 1/1962 | Langsdorf et al. | 260—67 |
| 3,193,532 | 7/1965 | Sidi | 260—67 |

FOREIGN PATENTS

| | | |
|---|---|---|
| 1,271,297 | 7/1961 | France. |
| 1,330,593 | 5/1963 | France. |
| 1,371,635 | 7/1964 | France. |

OTHER REFERENCES

Sittig, Hydrocarbon Processing & Petroleum Refiner, vol. 41, No. 11, November 1962, pp. 131–170 (p. 154 relied on).

Kern et al., Angewandte Chemie, 73 No. 6, pp. 177–186, Mar. 21, 1962) (page 183 relied on).

Kunststoffe, vol. 53, July 1963, pp. 424–436. English translation available, pp. 11–21.

WILLIAM H. SHORT, *Primary Examiner.*

L. M. PHYNES, *Assistant Examiner.*